(12) United States Patent
Dawidziak et al.

(10) Patent No.: US 10,466,140 B2
(45) Date of Patent: Nov. 5, 2019

(54) WOODWORKING SPINDLE, MOULDING MACHINE WITH SUCH A SPINDLE, AND METHOD USING SUCH A SPINDLE

(71) Applicant: Michael Weinig AG, Tauberbischofsheim (DE)

(72) Inventors: Albrecht Dawidziak, Großrinderfeld (DE); Hubert Klein, Wertheim-Nassig (DE)

(73) Assignee: Michael Weinig AG, Tauberbischofsheim (DE)

( * ) Notice: Subject to any disclaimer, the term of this patent is extended or adjusted under 35 U.S.C. 154(b) by 154 days.

(21) Appl. No.: 15/429,200

(22) Filed: Feb. 10, 2017

(65) Prior Publication Data
US 2017/0227420 A1 Aug. 10, 2017

(30) Foreign Application Priority Data
Feb. 10, 2016 (DE) .......................... 10 2016 001 745

(51) Int. Cl.
| | | |
|---|---|---|
| *G01M 13/04* | (2019.01) | |
| *B27C 1/08* | (2006.01) | |
| *F16C 41/00* | (2006.01) | |

(52) U.S. Cl.
CPC .............. *G01M 13/04* (2013.01); *B27C 1/08* (2013.01); *F16C 41/00* (2013.01); *F16C 2233/00* (2013.01); *F16C 2322/39* (2013.01)

(58) Field of Classification Search
CPC ........... B27C 1/00; B27C 1/005; B27C 1/007; B27C 1/02; B27C 1/04; B27C 1/06; B27C 1/08; B27C 1/14
(Continued)

(56) References Cited

U.S. PATENT DOCUMENTS

| | | | | |
|---|---|---|---|---|
| 5,895,181 A | * | 4/1999 | Ito ...................... | B23Q 11/0003 409/132 |
| 6,505,972 B1 | * | 1/2003 | Harbottle ................. | B23Q 1/70 384/517 |

(Continued)

FOREIGN PATENT DOCUMENTS

| | | |
|---|---|---|
| DE | 10 2004 050 270 | 4/2006 |
| DE | 10 2010 003 338 | 9/2011 |

(Continued)

*Primary Examiner* — Matthew Katcoff
(74) *Attorney, Agent, or Firm* — Gudrun E. Huckett (57) ABSTRACT

A woodworking spindle has a spindle shaft disposed in a spindle housing. One or more rotary bearings support the spindle shaft in the spindle housing. One or more temperature sensors are provided that detect the temperature of the one or more rotary bearings. An evaluation unit is provided and temperature signals generated by the temperature sensors are supplied to the evaluation unit that generates output signals based on evaluation of the temperature signals generated by the temperature sensors. In a method for monitoring the temperature of rotary bearings of a spindle of a woodworking machine, the temperature of the rotary bearings is permanently detected and rotary bearing temperature signals are generated. The rotary bearing temperature signals are sent to an evaluation unit and compared with a first temperature limit value. A first output signal is generated when the temperature signals reach a first temperature limit value.

23 Claims, 5 Drawing Sheets

(58) Field of Classification Search
USPC .................................. 144/395, 405, 412
See application file for complete search history.

(56) References Cited

U.S. PATENT DOCUMENTS

| | | | | |
|---|---|---|---|---|
| 6,508,614 | B1 * | 1/2003 | Ozaki | B23Q 1/38 |
| | | | | 310/90.5 |
| 7,228,197 | B2 * | 6/2007 | Walter | B23Q 5/04 |
| | | | | 340/679 |
| 9,289,915 | B2 * | 3/2016 | Trudel | B27F 1/06 |
| 9,581,989 | B2 * | 2/2017 | Li | H02H 6/005 |
| 2007/0189650 | A1 | 8/2007 | Möller et al. | |
| 2009/0267429 | A1 | 10/2009 | Möller et al. | |
| 2012/0205880 | A1 | 8/2012 | Fronius et al. | |
| 2014/0166323 | A1 | 6/2014 | Cooper | |
| 2016/0121445 | A1 * | 5/2016 | Sogabe | B23Q 11/127 |
| | | | | 409/135 |
| 2017/0219152 | A1 * | 8/2017 | Petrou | F16L 27/087 |

FOREIGN PATENT DOCUMENTS

| | | |
|---|---|---|
| EP | 1 579 951 | 9/2005 |
| EP | 1 762 331 | 3/2007 |
| GB | 2 190 876 | 12/1987 |
| JP | H08-001606 | 1/1996 |

* cited by examiner

WOODWORKING SPINDLE, MOULDING MACHINE WITH SUCH A SPINDLE, AND METHOD USING SUCH A SPINDLE

BACKGROUND OF THE INVENTION

The invention concerns a woodworking spindle comprising a spindle housing in which a spindle shaft is supported by at least one rotary bearing; a moulding machine comprising spindles for machining elongate workpieces of wood, plastic material and the like in a continuous process in which the workpieces are machined at the longitudinal sides; as well as a method for monitoring the temperature of at least one rotary bearing of the spindle of a woodworking machine.

In woodworking machines, in particular moulding machines, spindles are employed with which tools required for machining are rotatably driven. The spindles have a spindle shaft which is rotatably supported in a spindle housing. During woodworking, the rotary bearings which support the spindle shaft in the spindle housing are partially subjected to great forces. This can lead to the rotary bearings becoming damaged. When a damaged rotary bearing is not recognized, this leads to failure of the corresponding spindle which requires extended periods of downtime of the machine as well as high repair costs. Due to a damaged rotary bearing, surrounding parts within the machine are possibly also impaired, possibly even damaged.

The invention has the object to design the spindle of the aforementioned kind, the moulding machine of the aforementioned kind, and the method of the aforementioned kind in such a way that an imminent failure of the spindle in the woodworking machine can be recognized at an early stage.

SUMMARY OF THE INVENTION

In accordance with the invention, this object is solved for the spindle of the aforementioned kind in that the spindle for detecting the temperature of the rotary bearing comprises at least one temperature sensor whose temperature signals are supplied to at least one evaluation unit that generates output signals as a function of this evaluation.

In accordance with the invention, this object is solved for the moulding machine in that the moulding machine comprises a spindle in accordance with the invention as described.

In accordance with the invention, this object is solved for the method in that with at least one temperature sensor the temperature of the rotary bearing is permanently detected and temperature signals supplied to at least one evaluation unit that compares the supplied temperature signals with a temperature limit value and generates an output signal when the supplied temperature signals reach the temperature limit value.

The spindle according to the invention comprises at least one temperature sensor with which the temperature of the rotary bearing can be detected. In this way, it can be reliably determined whether the temperature of the rotary bearing in operation of the spindle approaches a critical value. The temperature sensor generates temperature signals which are supplied to an evaluation unit which evaluates the temperature signals appropriately and generates output signals as a function of this evaluation. As a result of temperature monitoring, the user receives in good time prior to failure of the spindle an indication that a further use of the spindle may possibly be critical.

The temperature sensor can be arranged in the spindle housing adjacent to the rotary bearing. It is possible in this way to move the temperature sensor very close to the rotary bearing to be monitored. In this context, the spacing between the temperature sensor and the rotary bearing to be monitored can be very small so that the temperature of the rotary bearing can be detected reliably.

In an advantageous embodiment, the spindle housing is provided with at least one axial bore that opens at an end face of the spindle housing and serves for receiving the temperature sensor. The temperature sensor can be pushed from the end face of the spindle housing very simply so far into the axial bore that its sensor head or temperature sensing means of the sensor is positioned adjacent to the rotary bearing. The axial course of the bore in the spindle housing has the advantage that adjusting movements of the spindle axis, in particular of the spindle housing, in axial direction as well as transverse thereto are not impaired when the sensor signals (temperature signals) are conveyed by sensor cables. Within the bore the sensor is arranged in a protected manner and does not interfere when adjusting the spindle.

In another advantageous embodiment, the spindle housing comprises at least one approximately radially extending bore which opens at the exterior side of the spindle housing. Such a bore can be provided in a very simple way on the spindle housing. When the temperature sensor is provided with a sensor cable, the sensor cable can be extended on a shortest possible path to the exterior.

A particularly advantageous configuration results when the temperature sensor is arranged directly on or in the rotary bearing, preferably on or in the outermost stationary bearing ring. The temperature of the rotary bearing is then detected with high precision.

When the spindle comprises several rotary bearings, for example, two rotary bearings, then each rotary bearing is provided in an advantageous way with at least one temperature sensor, respectively. However, when it is known that, for example, only one of a plurality of rotary bearings exhibits temperature problems, then it is sufficient to monitor only this one rotary bearing by means of at least one temperature sensor.

The temperature signals of the temperature sensor either can be transmitted by at least one sensor cable or can be transmitted wireless instead. The wireless transmission of the sensor signals (temperature signals) has the advantage that the installation of sensor cables in the spindle and optionally further conveyance to the evaluation unit within the woodworking machine are eliminated.

The temperature signals of the temperature sensor are transmitted advantageously to a control unit of the moulding machine. This control unit of the moulding machine forms the evaluation unit which evaluates the temperature signals sent by the temperature sensor.

In the moulding machine according to the invention, at least one of the spindles is embodied in accordance with the invention. Advantageously, all spindles of the moulding machine are furnished with the at least one temperature sensor with which the temperature of the rotary bearing of this spindle can be detected. The user of the moulding machine therefore obtains reliably a status report on all spindles of the moulding machine so that he is advised in good time if one or more of the spindles are at risk of failure.

Since the temperature of the rotary bearing can be affected by the ambient temperature of the spindle, the moulding machine according to the invention advantageously has at least one additional temperature sensor which detects the inner temperature of the moulding machine, i.e., the ambient temperature of the spindle in the moulding machine.

In a preferred embodiment, the temperature signals of this additional temperature sensor are used for compensation of the temperature limit value of the rotary bearing. For example, when the ambient temperature in the moulding machine rises, the rotary bearing will heat up also without this being the result of excessive load on the rotary bearing. Accordingly, taking into consideration the measured ambient temperature, the temperature limit value is correspondingly raised so that the effect of the ambient temperature on the temperature of the rotary bearing is compensated. The compensation can also be carried out directly at the temperature signals of the individual sensors.

In the method according to the invention, the temperature of the rotary bearing is continuously detected with the at least one temperature sensor and the generated temperature signals are supplied to the evaluation unit. The evaluation unit compares the supplied sensor signals (temperature signals) with the temperature limit value. When the temperature limit value is reached, the evaluation unit produces a corresponding output signal.

This output signal generated by the evaluation unit can be a warning signal that indicates to the user that the monitored spindle has reached a critical range. The warning signal can be an acoustic and/or visual signal or, for example, a warning message on a screen and the like.

The output signal generated by the evaluation unit can also be a switch-off signal by means of which machine functions are switched off, i.e., the spindles and/or the feed action are switched off. In this way, an overload and thus damage of the spindle are reliably avoided. Advantageously, on the basis of the evaluated temperature signals, all spindles and the feed action of the moulding machine are automatically switched off.

It is advantageous when two differently high temperature limit values are monitored by the evaluation unit. When for the first time the lower temperature limit value is reached, then the evaluation unit advantageously can generate a warning signal. If no measures are initiated by the user, then the evaluation unit upon reaching the higher temperature limit value generates a further output signal that in this case is advantageously a switch-off signal with which the monitored spindle or further machine functions are switched off.

Advantageously, when performing the method, not only the temperature of the rotary bearing but also the ambient temperature of the monitored spindle is detected by at least one additional temperature sensor. This ambient temperature is then used for compensation of the temperature limit value of the rotary bearing and/or of the temperature value.

Advantageously, the temperature signals of the temperature sensor and/or of the additional temperature sensor are saved in at least one memory. This memory can be a separate memory associated with the woodworking machine. The temperature signals can however also be saved on a network server or, for example, in a cloud memory. Storing the temperature signals has the advantage that a maintenance provider, but also the user, can look up any time a history regarding the temperature course of the rotary bearing.

It is particularly advantageous when the data are stored such that they can be retrieved by a smart device.

In a preferred embodiment, upon reaching the temperature limit value, an output signal as a maintenance signal is sent to a maintenance provider who then can take appropriate measures in order to check, for example, the causes of the temperature increase of the rotary bearing or plan for and initiate preventive maintenance.

The subject matter of the application does not only result from the subject matter of the individual claims but also from all specifications and features which are disclosed in the drawings and the description. They are claimed as important to the invention, even if they are not subject matter of the claims, inasmuch as they are novel, individually or in combination, relative to the prior art.

Further features of the invention result from the further claims, the description, and the drawings.

BRIEF DESCRIPTION OF THE DRAWINGS

The invention will be explained with the aid of an embodiment illustrated in the drawings in more detail.

DESCRIPTION OF PREFERRED EMBODIMENTS

Figure 1:
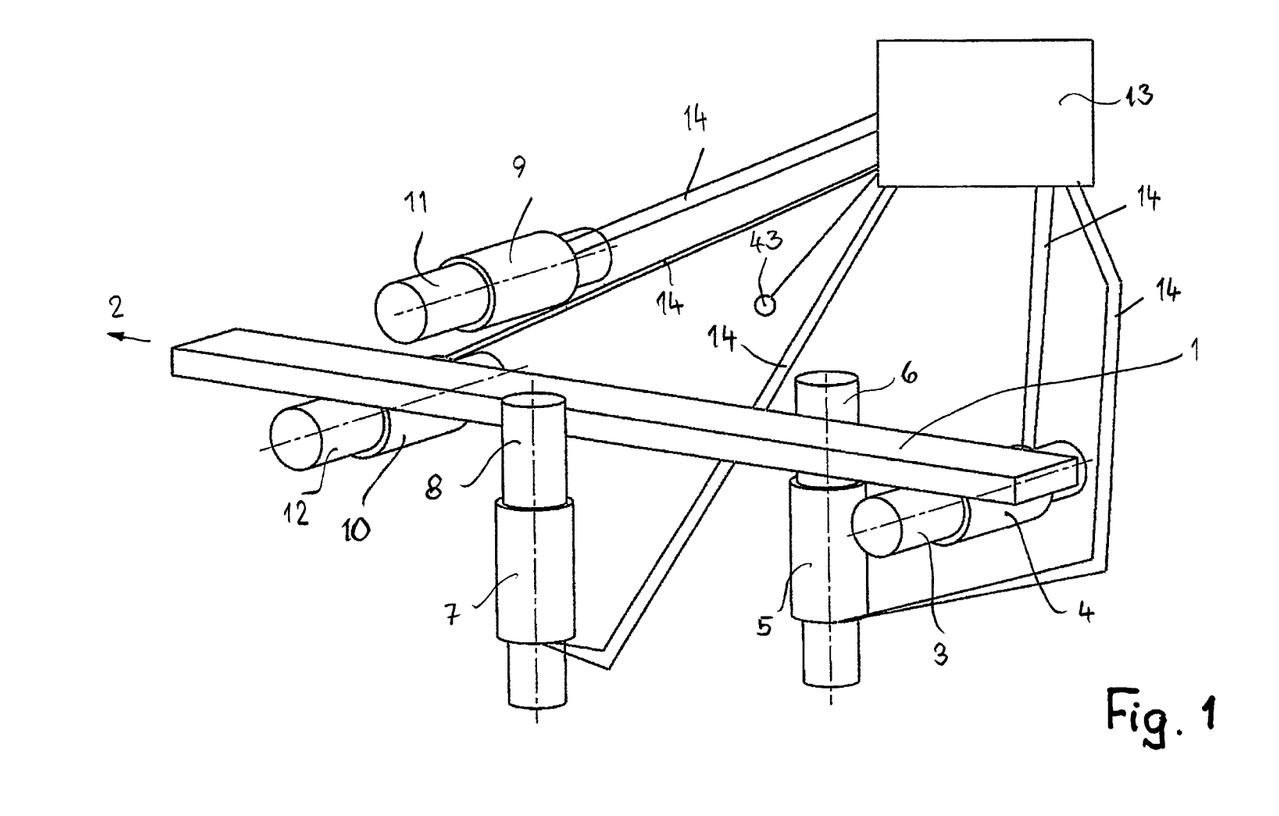
FIG. 1 shows in schematic illustration a moulding machine according to the invention with spindles according to the invention.

FIG. 1 shows in schematic illustration a moulding machine with which workpieces 1 of wood, plastic material and the like, that are rectangular in cross section, can be machined on all four sides in a continuous process. FIG. 1 shows only the spindles and the tools, seated thereon and schematically indicated, with which the workpiece machining is carried out. The transport elements, supports for the workpieces, and the like are not shown for clarity. The workpieces 1 are transported in transport direction of arrow 2 through the moulding machine. First, the bottom side of the workpieces 1 is machined by a tool 3 which is seated on a horizontal spindle 4. With the tool 3, the workpiece 1 is planed straight, for example. In transport direction (arrow 2) downstream of the lower horizontal spindle 4, a vertical right spindle 5 is provided that carries a tool 6 with which the right longitudinal side of the workpiece 1 in the transport direction (arrow 2) is machined as the workpiece passes through. In transport direction (arrow 2) downstream of the right vertical spindle, there is a left vertical spindle 7 on which a tool 8 is seated with which in the transport direction (arrow 2) the left longitudinal side of the workpiece 1 is machined. In the transport direction (arrow 2) downstream of the left vertical spindle, an upper as well as a lower horizontal spindles 9, 10 are provided whose tools 11, 12 machine the top side and the bottom side of the workpiece 1. The tools can be planing tools or profiling tools, respectively, with which the respective sides are either planed straight or provided with a profile.

For all spindles 4, 5, 7, 9, 10, the bearings are monitored by temperature sensors whose temperature signals are supplied to a control unit 13. These temperature signals can be transmitted by sensor cables 14, but also wireless, to the control unit 13 of the moulding machine.

With the aid of FIGS. 2 through 5, the spindle 4 will be explained in more detail. The other spindles 5, 7, 9, 10 of the moulding machine are of the same principal configuration.

Figure 2:
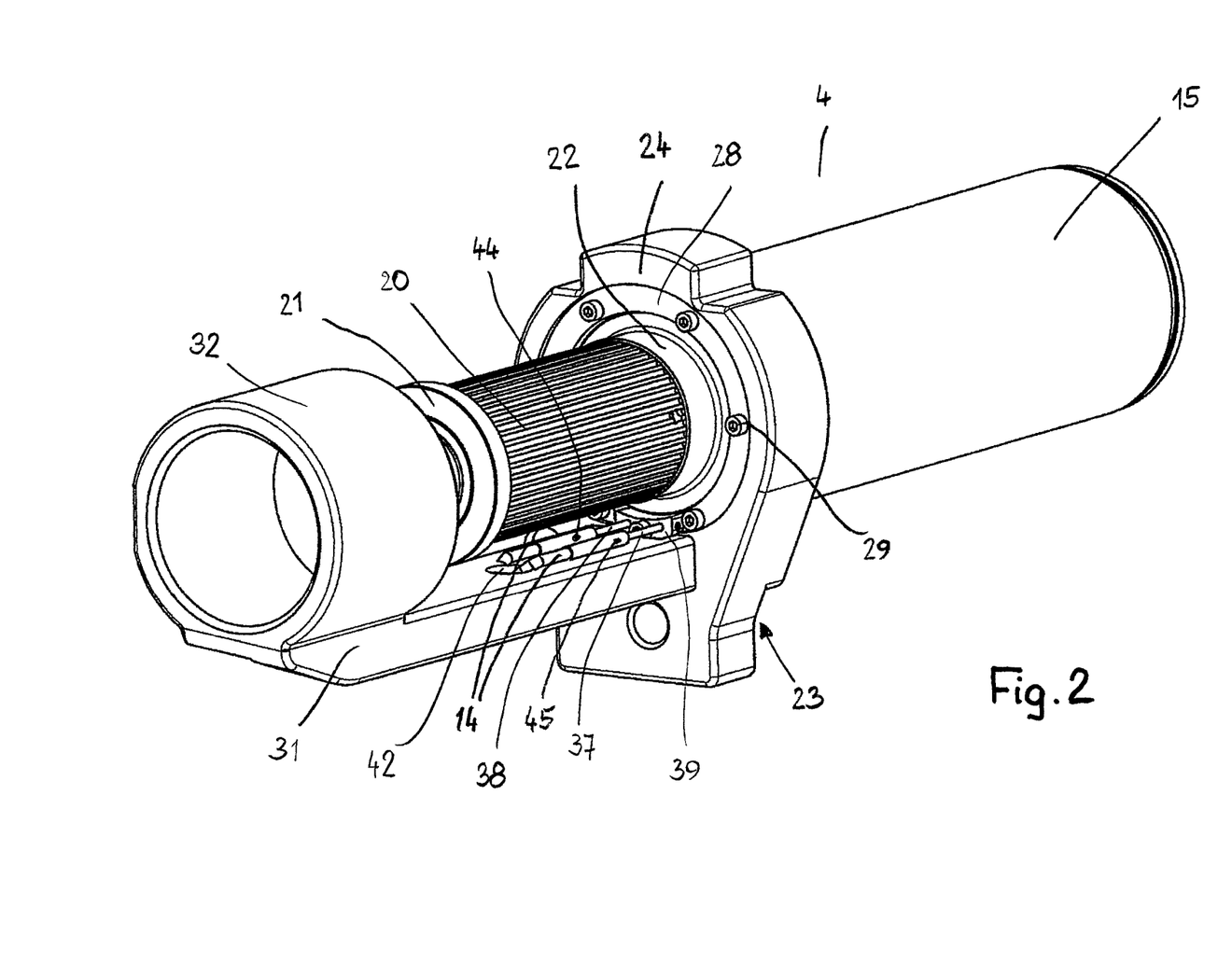
FIG. 2 shows in perspective illustration a spindle according to the invention.
Figure 3:
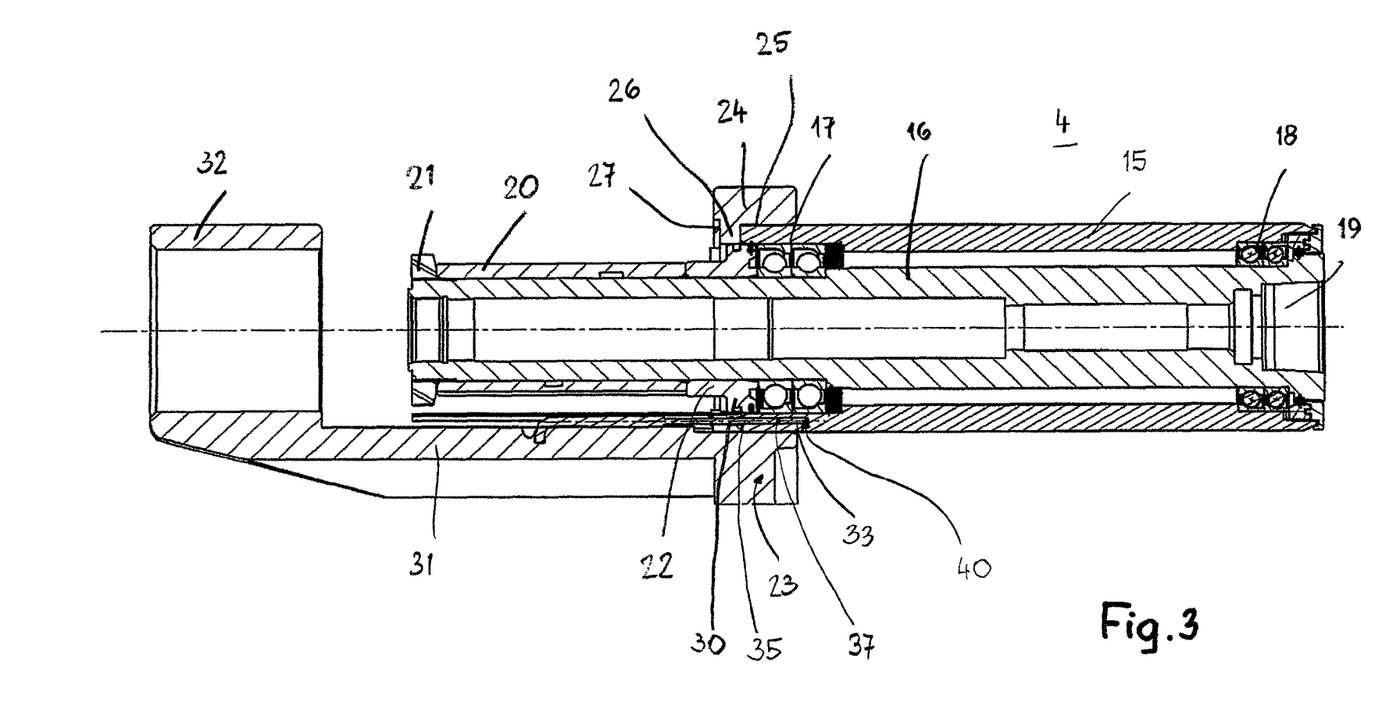
FIG. 3 shows an axial section of the spindle according to the invention according to FIG. 2.
Figure 4:
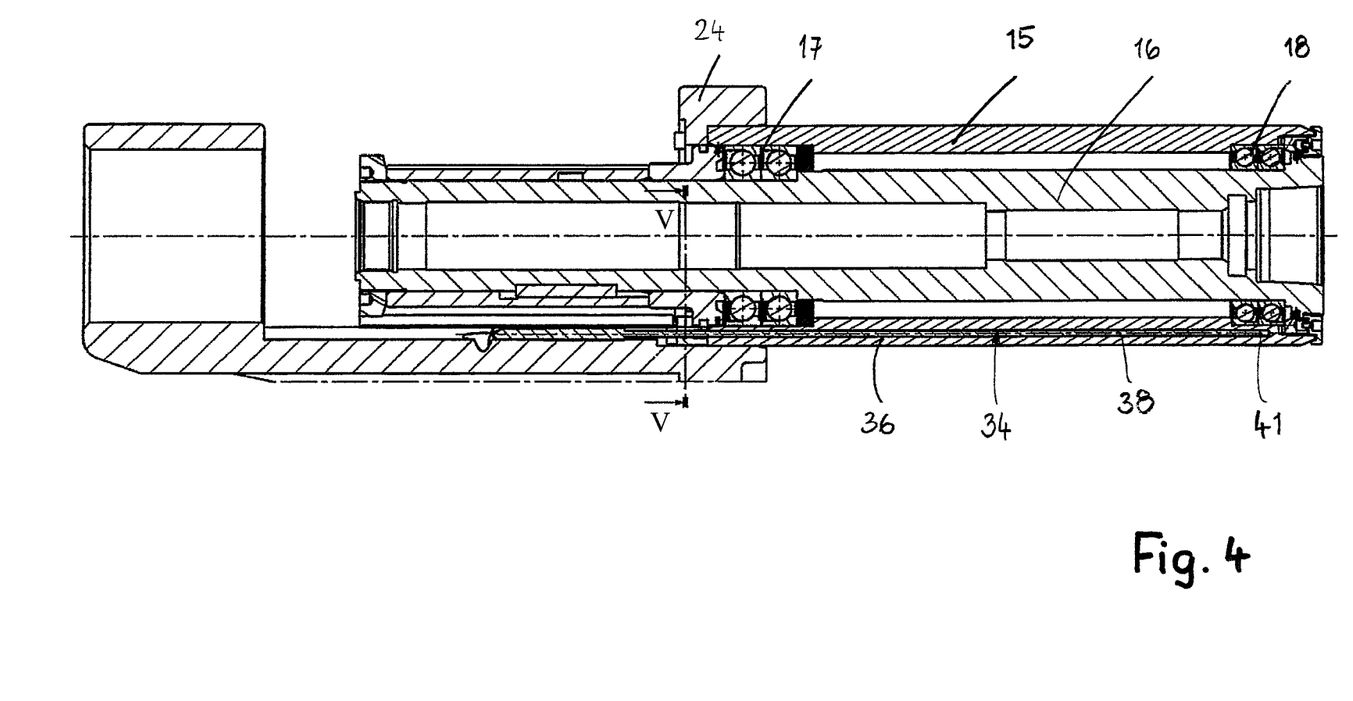
FIG. 4 shows an axial section of the spindle according to the invention according to FIG. 2.

The spindle 4 has a spindle housing 15 in which a spindle shaft 16 is rotatably supported. The spindle housing 15 is in an exemplary fashion a cylindrical spindle sleeve which surrounds the spindle shaft 16 at a spacing. At both ends of the spindle housing 15, there are rotary bearings 17, 18 for supporting the spindle shaft 16. The rotary bearings 17, 18 are advantageously roller bearings, in the embodiment ball bearings. Advantageously, two ball bearings each are provided adjoining each other at each end of the spindle housing 15. The rotary bearings 17, 18 are axially secured in a suitable way in the spindle housing 15. The spindle 4 with the spindle housing 15 is received in a bore of a spindle carriage, not illustrated, and can be axially adjusted in this bore in a way known in the art. This adjustment can be referred to as a quill adjustment.

The spindle shaft 16 at its one end is provided with a receptacle 19 which, in the embodiment, is an HSK receptacle (HSK: abbreviation for German technical term "Hohlschaftkegel" which translates to hollow taper shank) that receives a tool. At the end axially projecting past the spindle housing 15, a drive disk 20, which is a toothed belt pulley in the embodiment, is provided across which an endless belt of a drive is guided with which the spindle shaft 16 is driven in rotation. The drive disk 20 is seated fixedly on the spindle shaft 16 and is secured axially between two rings 21, 22 fastened on the spindle shaft 16. The ring 21 is designed as a nut and serves, together with the drive disk 20 and the ring 22, also for axially securing the rotary bearing 17.

A holder 23 is fastened on the spindle 4. It comprises a receiving ring 24 which is provided at an end face with a recess 25 into which the spindle housing 15 projects with one end. The recess 25 is delimited axially by a radially inwardly oriented annular flange 26 on which the spindle housing 15 is resting with its end face rim.

The receiving ring 24 comprises at its other end face a further recess 27 which is significantly flatter than the recess 25 and which results from a cutting machining process of the cast holder 23. The bottom 28 (FIG. 2) machined in this way is penetrated by fastening screws 29 which are arranged in distribution about the circumference of the recess 27 and are screwed into threaded bores at the end face of the spindle housing 15.

The annular flange 26 as well as the neighboring area of the spindle housing 15 have approximately the same inner diameter. The ring 22 has a radially outwardly oriented annular flange 30 which, relative to the inner side of the annular flange 26 as well as relative to the inner side of the spindle housing 15, has only minimal spacing and in this way forms a sealing gap. In this way, penetration of cuttings or dust into the rotary bearings 17 is prevented.

A support arm 31 is projecting away from the receiving ring 24 which at the free end is provided with a securing ring 32 in which a release unit (not illustrated) for the tools 3 clamped in the spindle 4 is secured. They are clamped in the HSK receptacle of the spindle 4 by known clamping means, not illustrated. The holder 23 not only serves for holding the release unit but also as a support of a nut or a thread for the axial adjustment of the spindle.

Figure 5:
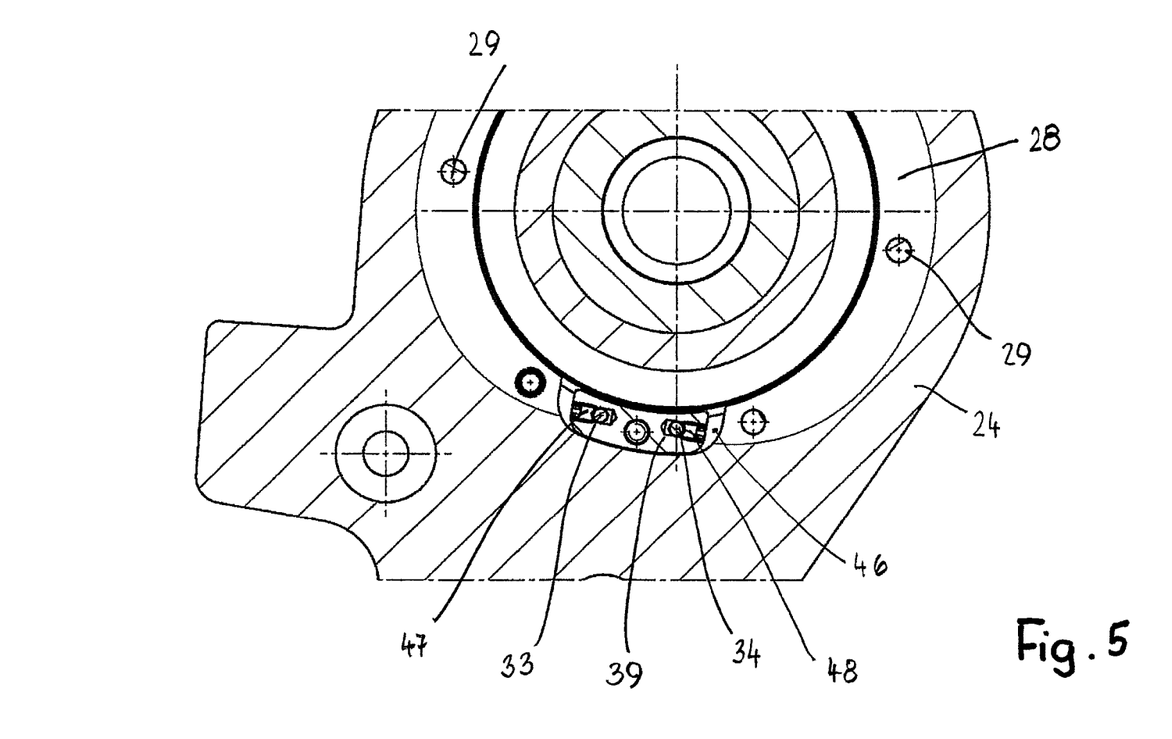
FIG. 5 shows in a radial section according to section line V-V of FIG. 4 the fastening area of two temperature sensors on the spindle according to the invention.

The spindle 4 is provided with temperature sensors 33, 34 with which the temperature of the rotary bearings 17, 18 can be detected. In the embodiment, the temperature sensors 33, 34 are guided through axial bores 35, 36 (FIGS. 3 and 4) in the spindle housing 15 to the respective bearings 17, 18. The sensors have a sensor head 40, 41, the actual temperature sensing means, which is introduced into the forward end of a thin tube 37, 38 through which sensor cables (sensor wires) 14 are guided outwardly. Adjoining the tube 37, 38, there is a sleeve 44, 45 (FIG. 2), advantageously a ferrule, having the encased flexible sensor cables 14 exiting at its end facing away from the tube 37, 38. The axial bores 35, 36 extend from the end face of the spindle housing 15 which is located in the receiving ring 24. The temperature sensors 33, 34 project with their tubes 37, 38 through a fastening block 39 out of the spindle housing 15. The fastening block 39 is detachably connected to the spindle housing 15. The annular flange 26 of the receiving ring 24 is interrupted in the area of the fastening block 39 by a cutout 46 (FIG. 5). The rims of the cutout 46 each have a spacing from the fastening block 39. In the fastening block 39, the tubes 37, 38 and thus the temperature sensors 33, 34 are secured so that they cannot be displaced in the bores 35, 36. In this way, it is ensured that the sensor head 40, 41 is always at the level of the rotary bearings 17, 18 to be monitored. The securing action can be realized, as in the embodiment, by threaded pins 47, 48 laterally screwed into the fastening block 39. In this way, length tolerances or also bores 35, 36 of different depth can be compensated. It is also possible to provide the sensors 33, 34 with a thread and to screw them into the fastening block 39.

The sensor cables 14 are guided in a suitable way to the machine control unit 13 as described and explained in an exemplary fashion with the aid of FIG. 1 and sensor cables 14. In the illustrated embodiment, the sensor cables 14 are further extended through openings 42 in the support arm 31.

In deviation from the illustrated embodiment, the temperature sensors 33, 34 can also be extended radially to the rotary bearings 17, 18 to be monitored. In this case, bores of only very short length are required for the temperature sensors 33, 34.

With the temperature sensors 33, 34, the temperature of the rotary bearings 17, 18 can be permanently monitored. The temperature signals (rotary bearing temperature signals) of the temperature sensors 33, 34 are supplied to an evaluation unit. In the simplest case, upon surpassing a predetermined temperature limit value, an output signal is generated by the evaluation unit. It can be used to send a warning message to the user of the spindle or the moulding machine. Also, it is possible to use this output signal in order to switch off the corresponding machine function, for example, the rotary drive of the spindle 4 or the feed action, i.e., to switch off the workpiece transport through the moulding machine. This limit value for the temperature of the rotary bearing 17, 18 can be adjusted so low that the corresponding evaluated output signal based on the temperature signals of the sensors 33, 34 is sent out in good time when the rotary bearings 17, 18 are not yet damaged. The temperature sensors 33, 34 serve in this case for preventive maintenance as well as early detection of bearing damage. In this way, it is reliably prevented that, because of bearing damage that has not been detected early enough, subsequent damages on the spindle or the moulding machine will occur.

It is advantageous when not only one limit value but, for example, also two or more limit values are provided. For example, upon surpassing the first limit value a first warning can be generated that informs the user that upon further operation of the spindle possibly greater bearing damages may occur. Upon reaching a second higher limit temperature, the control unit 13 can be configured such that it then switches off the spindles 4, 5, 7, 9, 10 as well as the feed action in order to prevent subsequent damages.

By use of the temperature sensors 33, 34, a proactive maintenance and thus a reduction of unplanned periods of downtime are possible which would occur if the temperature monitoring of the rotary bearings were not performed. Since damages on the rotary bearings 17, 18 can be detected upon use of the temperature sensors 33, 34 at an early point in time, subsequent damages of the spindle 4 as well as of surrounding parts within the machine can be prevented. Also, repair costs are reduced in this way.

In the illustrated and described embodiment, the sensor signals (temperature signals) are transmitted by sensor cables 14 to the machine control unit 13. However, temperature sensors can be used also which transmit their temperature signals wireless. In this case, the temperature sensors can be in particular installed directly on or in the rotary bearings 17, 18 so that the temperature of the rotary bearings 17, 18 can be detected even more precisely. The temperature sensors 33, 34 can transmit their temperature signals in an exemplary fashion by radiocommunication, for example, to receiving units which are arranged in the area of the individual spindles. The receiving units for the wireless transmission of the sensor signals (temperature signals) are then connected again by sensor cables 14 with the control unit 13. Such sensors facilitate installation in the spindle 4 because no measures for passing through sensor cables are required anymore.

Even when the temperature sensors 33, 34 are transmitting their temperature signals through the sensor cables 14, the sensors can be arranged directly in the rotary bearing 17, 18.

The reliability of the bearing diagnosis or of detection of a bearing damage can be improved in an advantageous way in that also the ambient temperature of the spindle 4 is measured. For this purpose, as indicated schematically in FIG. 1, at least one additional temperature sensor 43 is provided which is connected to the machine control unit or evaluation unit 13. This additional temperature sensor 43 can also transmit its temperature signals (ambient temperature signals) by sensor cables or wireless, for example, by radiocommunication. With the detection of the ambient temperature of the spindle 4, the effect of the ambient temperature on the temperature of the rotary bearings 17, 18 can be taken into account and compensated in the evaluation unit.

Since the interior temperature of the machine detected by the at least one additional temperature sensor 43 has an effect on the temperature of the rotary bearings 17, 18, the control unit 13 can be configured such that the limit values of the bearing temperatures or the detected bearing temperature values themselves are automatically adjusted to the measured interior temperature. For example, when the interior temperature of the machine detected by the temperature sensor 43 rises, the temperature of the rotary bearings 17, 18 rises also. This temperature increase then has nothing to do with a corresponding load on the rotary bearings. Accordingly, the control unit or the evaluation unit of the temperature sensors is configured such that the corresponding limit values are increased such that the effect of the inner temperature of the machine on the temperature of the rotary bearings 17, 18 is compensated.

Moreover, the control unit 13 or evaluation unit can be configured such that it does not automatically compensate or adjust the temperature limit value of the rotary bearings 17, 18 but adjusts the spindle temperature values as a function of the inner temperature of the machine in that, for example, an inner temperature dependent corrective value is subtracted from or added to the measured temperature value. A combination of both methods is possible also.

The automatic adaptation and compensation has the advantage that the user of the machine must not himself perform the adjustment.

However, it is also possible to configure the control unit 13 such that the limit values for the bearing temperatures are adjusted manually as a function of the measured interior temperature of the machine.

The temperature monitoring of the rotary bearings 17, 18 can be configured such that the temperature values are saved continuously. In this way, it is possible to record the history of the temperature course of the individual temperature sensors 33, 34 and to check, for example, the frequency of surpassing the limit values across a certain period of time. These saved data can be stored, for example, in the evaluation unit, the machine control unit, or by transmission to a cloud so that authorized persons at any time can retrieve the saved measured values and evaluate them. This is in particular advantageous for maintenance. In particular storage in a cloud provides the possibility of advantageous utilization of so-called smart devices and apps for analysis and display of certain data from machine-independent locations.

Since the rotary bearings 17, 18 are monitored separately, their state can be monitored independent of each other.

When recording the measured data in a memory, different kinds of values can be additionally recorded. A timestamp is recorded which indicates at which point in time the recorded monitoring and storing of the entire data set has taken place. Not only the temperature values of the rotary bearings 17, 18 but also of the ambient temperature of the monitored spindles, i.e., the interior temperature in the machine can be recorded. Moreover, it is possible to store status data of the machine, for example, whether at the point in time of recording the monitored spindles are switched on or off, whether the feed action is switched on or off, whether workpieces 1 to be machined are present in the machine, which profile is to be generated on the workpieces, and the like. Based on the history of these stored values, it can also be recognized, for example, when and how long the spindles or the feed action has been switched on or off.

The temperature signals of the temperature sensors 33, 34 are supplied to one or a plurality of evaluation units, as described. They can be components of the machine control unit or can be provided as a unit or units independent thereof. In the latter case, the evaluation unit can switch off directly the described machine functions and send an output signal to the machine control unit for displaying a warning or error message.

It is advantageous when the respective actual temperatures are retrievable directly on the screen of the machine control unit and those temperatures which surpass the set limit values are marked, for example, are highlighted by color, printed in color, are flashing or the like. Also, it is advantageous when the operator by means of the machine control unit receives a message that indicates based on which exceedance of limit values at which bearing of which spindle the machine (spindles and feed action) has been switched off.

The specification incorporates by reference the entire disclosure of German priority document 10 2016 001 745.7 having a filing date of Feb. 10, 2016.

While specific embodiments of the invention have been shown and described in detail to illustrate the inventive principles, it will be understood that the invention may be embodied otherwise without departing from such principles.

What is claimed is:

1. A woodworking spindle comprising:
a spindle housing comprising one or more axial bores that open at an axial end face of the spindle housing;
a spindle shaft disposed in the spindle housing;
one or more rotary bearings supporting the spindle shaft in the spindle housing;
one or more temperature sensors for detecting a temperature of the one or more rotary bearings, wherein the one or more temperature sensors are arranged in the one or more axial bores of the spindle housing;
at least one evaluation unit, wherein temperature signals generated by the one or more temperature sensors are supplied to the at least one evaluation unit that generates output signals based on an evaluation of the temperature signals generated by the one or more temperature sensors.

2. The woodworking spindle according to claim 1, wherein the one or more temperature sensors are arranged in the spindle housing adjacent to the one or more rotary bearings.

3. The woodworking spindle according to claim 1, wherein the spindle housing comprises one or more radially extending bores that open at an exterior side of the spindle housing, wherein the one or more temperature sensors are arranged in the one or more radially extending bores.

4. The woodworking spindle according to claim 1, wherein the one or more temperature sensors are arranged directly on or in the one or more rotary bearings.

5. The woodworking spindle according to claim 1, wherein at least one of the one or more rotary bearings; is provided with the one or more temperature sensors.

6. The woodworking spindle according to claim 1, wherein all of the one or more rotary bearings are provided with one or more of the temperature sensors.

7. The woodworking spindle according to claim 1, further comprising one or more sensor cables connecting the one or more temperature sensors and the evaluation unit, wherein the temperature signals of the one or more temperature sensors are transmitted through the one or more sensor cables.

8. The woodworking spindle according to claim 1, wherein the temperature signals of the one or more temperature sensors are transmitted wireless to the evaluation unit.

9. The woodworking spindle according to claim 1, wherein the evaluation unit is a control unit of a moulding machine.

10. A moulding machine comprising one or more spindles with tools for machining longitudinal sides of elongate workpieces of wood and plastic material in a continuous process, wherein at least one of the spindles comprises:
a spindle housing comprising one or more axial bores that open at an axial end face of the spindle housing;
a spindle shaft disposed in the spindle housing;
one or more rotary bearings supporting the spindle shaft in the spindle housing;
one or more temperature sensors for detecting a temperature of the one or more rotary bearings, wherein the one or more temperature sensors are arranged in the one or more axial bores of the spindle housing;
at least one evaluation unit, wherein temperature signals generated by the one or more temperature sensors are supplied to the at least one evaluation unit that generates output signals based on an evaluation of the temperature signals generated by the one or more temperature sensors.

11. The moulding machine according to claim 10, further comprising at least one additional temperature sensor detecting an inner temperature of the moulding machine.

12. The moulding machine according to claim 11, wherein temperature signals of the at least one additional temperature sensor are used for adjusting a preset temperature limit value of a rotary bearing temperature and/or a measured temperature value of said at least one spindle.

13. A method for monitoring a temperature of one or more rotary bearings of a spindle of a woodworking machine, wherein the spindle comprises a spindle housing; a spindle shaft disposed in the spindle housing; one or more rotary bearings supporting the spindle shaft in the spindle housing; one or more temperature sensors for detecting a temperature of the one or more rotary bearings; at least one evaluation unit, wherein temperature signals generated by the one or more temperature sensors are supplied to the at least one evaluation unit that generates output signals based on an evaluation of the temperature signals generated by the one or more temperature sensors; the method comprising:
permanently detecting the temperature of the one or more rotary bearings and generating rotary bearing temperature signals;
supplying the rotary bearing temperature signals to the at least one evaluation unit;
comparing in the at least one evaluation unit the rotary bearing temperature signals with a first preset temperature limit value;
generating a first output signal when the rotary bearing temperature signals reach the first preset temperature limit value;
detecting an ambient temperature of the spindle by at least one additional temperature sensor that generates ambient temperature signals and, based on the ambient temperature signals, adjusting the first preset temperature limit value in order to compensate for the ambient temperature of the spindle.

14. The method according to claim 13, wherein the output signal is a warning signal.

15. The method according to claim 13, wherein the output signal is a switch-off signal switching off machine functions of the woodworking machine.

16. The method according to claim 13, wherein the output signal is a switch-off signal switching off the spindle.

17. The method according to claim 13, further comprising generating a second output signal when the rotary bearing temperature signals reach a second preset temperature limit value that is higher than the first preset temperature limit value.

18. The method according to claim 13, further comprising utilizing the ambient temperature signals for adjusting a second preset temperature limit value that is higher than the first preset temperature limit value.

19. The method according to claim 13, further comprising storing the rotary bearing temperature signals and the ambient temperature signals as stored data in at least one memory.

20. The method according to claim 19, further comprising retrieving the stored data by an app provided on a smart device.

21. The method according to claim 13, further comprising sending a signal to a maintenance provider when the first preset temperature limit value is reached.

22. A method for monitoring a temperature of one or more rotary bearings of a spindle of a woodworking machine, wherein the spindle comprises a spindle housing; a spindle shaft disposed in the spindle housing; one or more rotary bearings supporting the spindle shaft in the spindle housing; one or more temperature sensors for detecting a temperature of the one or more rotary bearings; at least one evaluation unit, wherein temperature signals generated by the one or more temperature sensors are supplied to the at least one evaluation unit that generates output signals based on an evaluation of the temperature signals generated by the one or more temperature sensors; the method comprising:

- permanently detecting the temperature of the one or more rotary bearings and generating rotary bearing temperature signals;
- supplying the rotary bearing temperature signals to the at least one evaluation unit;
- comparing in the at least one evaluation unit the rotary bearing temperature signals with a first preset temperature limit value;
- generating a first output signal when the rotary bearing temperature signals reach the first preset temperature limit value;
- detecting an ambient temperature of the spindle by at least one additional temperature sensor that generates ambient temperature signals and, based on the ambient temperature signals, adjusting a measured temperature value of the spindle in order to compensate for the ambient temperature of the spindle.

23. The method according to claim 22, further comprising generating a second output signal when the rotary bearing temperature signals reach a second preset temperature limit value that is higher than the first preset temperature limit value.

* * * * *